Z. MILLER.
Clover Huller.
No. 92,865.
Patented July 20, 1869.
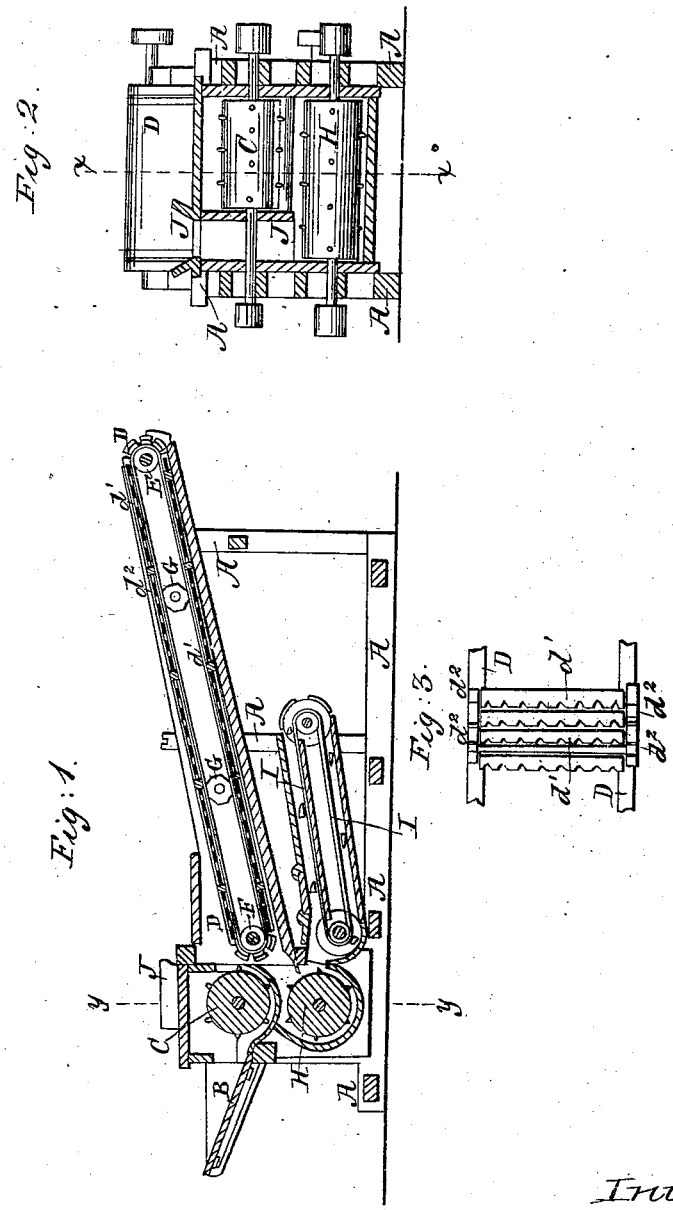

United States Patent Office.

ZEPHANIAH MILLER, OF CANAL FULTON, OHIO.

Letters Patent No. 92,865, dated July 20, 1869.

IMPROVEMENT IN MACHINE FOR THRESHING AND HULLING CLOVER-SEED.

The Schedule referred to in these Letters Patent and making part of the same.

*To all whom it may concern:*

Be it known that I, ZEPHANIAH MILLER, of Canal Fulton, in the county of Stark, and State of Ohio, have invented a new and improved Machine for Threshing and Hulling Clover-Seed; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved machine, taken through the line $x\ x$, fig. 2.

Figure 2 is a vertical cross-section of the same, taken through the line $y\ y$, fig. 1.

Figure 3 is a detail plan view of a portion of the carrier-belt.

Similar letters of reference indicate corresponding parts.

My invention has for its object to furnish an improved machine for threshing and hulling clover-seed, which shall be simple in construction and effective in operation; and It consists in the construction and combination of various parts of the machine, as hereinafter more fully described.

A is the frame of the machine.

B is the feed-apron, from which the clover is fed to the threshing-roller, or cylinder C, by which the pods are separated from the stems and straw, and which is provided with teeth in the ordinary manner.

From the cylinder C, the pods, stems, and straw pass to the endless belt D, by which the straw and stems are carried to the stack.

The belt D is formed by pivoting slats $d^1$ to endless chains of hinged blocks or links $d^2$, which pass around the pulleys E and F, at the upper and lower ends of the carrier, or belt D, and over the polygonal pulleys G, by which the belt is jarred or shaken as it moves around.

The slats $d^1$ are notched upon one edge, as shown in fig. 3, and are eccentrically pivoted at their ends to the blocks or links of the endless chains $d^2$.

By this construction, as the pods, stems, and straw pass upon and are being carried back by the endless belt, or carrier D, the seeds and pods pass through the notches of the slats $d^1$, and, dropping upon the lower part of said belt, which is moving in the opposite direction, are carried to the hulling-cylinder H.

The passage of the pods through the notches of the slats $d^1$ is facilitated by the action of the polygonal pulleys G in jarring the belt D.

By this construction of the carrier D, as the slats $d^1$ pass over the upper pulleys E, their positions are reversed, so that they may be in proper position for carrying the pods and seeds back to the hulling-cylinder H.

The pods and seeds that may pass through the notches of the slats $d^1$, while passing back, drop upon and slide down the inclined close bottom of the carrier to the hulling-cylinder H.

As the slats $d^1$ pass around the lower pulleys F, their positions are again reversed, which forms openings between the slats, to allow the pods that may still be upon the lower part of the belt to escape.

As the seed escapes from the hulling-cylinder H, it is received by the elevator I, by which it is carried to the cleaning-machine.

J is the hopper, into which the tollings from the cleaner are conveyed by the side elevator, (not shown in the drawings,) and into which are also put any pods or seed that do not require to be operated upon by the cylinder H.

The hopper J passes down at the end of the cylinder C, and communicates directly with the cylinder H, thus relieving the belt D from the labor of carrying matter that does not require to be operated upon by the cylinder C.

Having thus described my invention,

I claim as new, and desire to secure by Letters Patent—

1. The carrier-belt D, formed by eccentrically pivoting the ends of the notched slats $d^1$ to the endless chain of hinged blocks or links $d^2$, in combination with the toothed or threshing-cylinder C of a clover-seed machine, substantially as herein shown and described, and for the purpose set forth.

2. The hopper J, in combination with the threshing-cylinder C and hulling-cylinder H, substantially as herein shown and described, and for the purpose set forth.

3. The combination of the elevator I with the hulling-cylinder H of a clover-seed machine, substantially as herein shown and described, and for the purpose set forth.

4. The combination and arrangement of the threshing-cylinder C, endless belt or carrier D, constructed as described, hulling-cylinder H, elevator I, and hopper J, with each other, substantially as herein shown and described, and for the purpose set forth.

ZEPHANIAH MILLER.

Witnesses:
FR. GRIESINGER,
M. E. WILCOX,
B. E. HADYN.